E. TATSCHKE.
LUBRICATOR.
APPLICATION FILED NOV. 3, 1921.

1,417,216.

Patented May 23, 1922.

Inventor:
Edward Tatschke

UNITED STATES PATENT OFFICE.

EDWARD TATSCHKE, OF BERLIN, GERMANY.

LUBRICATOR.

1,417,216.

Specification of Letters Patent.   Patented May 23, 1922.

Application filed November 3, 1921. Serial No. 512,669.

*To all whom it may concern:*

Be it known that EDWARD TATSCHKE, a citizen of the Republic of Germany, residing at Berlin, Germany, has invented certain new and useful Improvements in Lubricators, (for which he filed an application in Germany on November 24, 1919,) of which the following is a specification.

My invention relates to lubricators and it consists in certain improvements in the construction thereof, as will be hereinafter fully described and pointed out in the claims. Especially my invention relates to lubricators adapted for the lubrication of pins, for example for the lubrication of those pins which in automobiles connect the springs supporting the vehicle to the chassis. With this object the pin itself is utilized, according to this invention, to hold the lubricator cup in place, the pin being provided upon its outer surface with one or a plurality of grooves for the passage of the lubricating medium.

Figure 1:
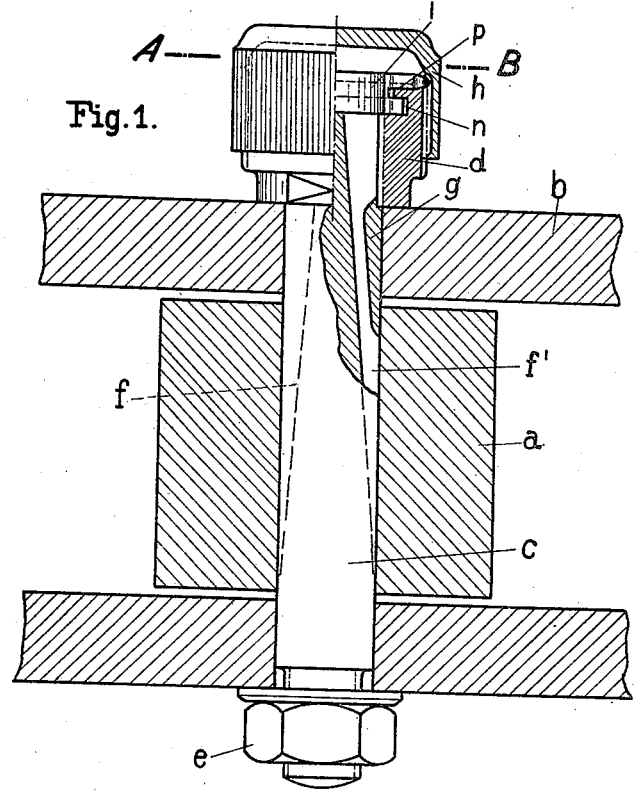
Figure 2:
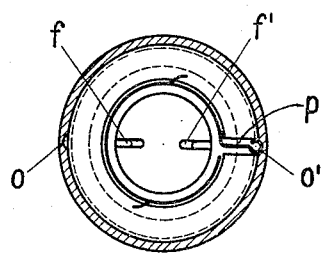
Figure 3:
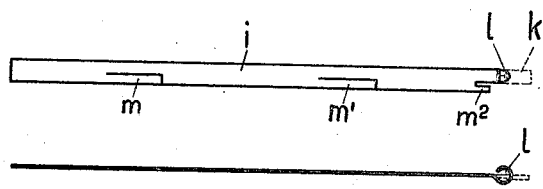

The subject matter of my invention is illustrated in the drawing as applied to one example in execution. Fig. 1 shows a total view with parts in section; Fig. 2 a section on line A—B of Fig. 1 and Fig. 3 shows a detail.

The supporting spring of the vehicle is indicated by $a$ and the chassis by $b$. The pin $c$ has a screw-thread which is screwed into the under-portion $d$. A screw-thread provided at the other end permits of a nut $e$ being screwed on.

The lubricating medium reaches the point for lubrication through lubricating grooves $f$, $f'$. With this mode of applying the lubricating grooves not only is the previous central boring avoided but also the transverse boring connecting therewith and the distributing grooves. The lubricating medium may be pressed very readily through the lubricating grooves running in unbroken lines and at all times an even distribution of the lubricating medium is assured. By means of cheap milled work as opposed to the previous expensive work of boring a reduction in cost of the whole construction is rendered possible.

In order to prevent the lubricating medium from escaping before reaching the spot for lubrication, the grooves $f$, $f'$ are closed outwardly at $g$. This can be effected either by subjecting the pin $c$ at that part to the effect of rolls which press the grooves together or by the insertion of softer material into the grooves at that part.

A plate spring $i$ in the sleeve $d$, shown extended (flattened) in Fig. 3, is cut away at one of its ends to about half the width and the portion $k$ left is rolled up to form a cylinder $l$, the edges being ground off so as to afford a rounder form, the cylinder engaging always in one of the grooves $o$ or $o'$ of the cap $h$. The sleeve $d$ has a recess $n$ and the plate spring has three slit portions $m$, $m'$, $m^2$, which when the spring is put in place, engage in the recess, in order thereby to ensure that the spring shall not fall out. For preventing turning with the cap $h$, the spring is held in a slot $p$ in the sleeve. The cap $h$ has screw threaded engagement with the sleeve $d$. By turning the cap the same operates as a piston forcing the lubricating medium through the grooves $f$, $f'$.

What I claim is:

1. A lubricator for spindles and the like comprising a sleeve embracing a portion of the end of the spindle and having an undercut recess with a portion overhanging the recess, said sleeve also having a slot extending transversely through its outer edge, a cap threaded on the sleeve and having notches on its inner side, and a locking ring lying within the outer portion of the sleeve and having a neck extending in engagement with the slot in the sleeve, said neck having its outer end adapted to engage in the notches in the cap, said ring having means thereon to engage in the undercut recess and against the inner side of the overhanging portion to avoid the withdrawal of the ring.

2. A lubricator for spindles and the like comprising a sleeve embracing an end of the spindle and having an undercut recess with an overhanging portion, a cap threaded on the sleeve having notches therein, and a locking ring lying within the outer portion of the sleeve and having an end thereon engaging non-rotatively with the sleeve and adapted to take into the recesses in the cap, said ring having fingers bent therefrom and lying within the recess and engaging the overhanging portion.

3. A lubricator for spindles and the like having lubricator receiving grooves opening on an end thereof comprising a sleeve embracing such end of the spindle and having an under-cut recess with an over-hanging portion and a slot extending through the outer edge of the sleeve, a cap threaded on the sleeve having notches therein, and a locking ring lying within the outer portion of the sleeve and having a neck extending in engagement with the slot in the sleeve provided with an outer nose adapted to engage in the notches in the cap, the under-portion of said ring having slit portions forming fingers adapted to be pressed outwardly of the ring and to fit within the recess of the sleeve and engage beneath the over-hanging portion.

In testimony that I claim the foregoing as my invention, I have signed my name in presence of two subscribing witnesses.

EDWARD TATSCHKE.

Witnesses:
C. B. BORGEOL,
ROFORD KOCH.